US008526613B2

(12) United States Patent
Pinder

(10) Patent No.: US 8,526,613 B2
(45) Date of Patent: *Sep. 3, 2013

(54) SUBSCRIBER NETWORK RECEIVING DIGITAL PACKETS AND TRANSMITTING DIGITAL PACKETS BELOW A PREDETERMINED MAXIMUM BIT RATE

(76) Inventor: Howard G. Pinder, Norcross, GA (US)

( * ) Notice: Subject to any disclaimer, the term of this patent is extended or adjusted under 35 U.S.C. 154(b) by 1666 days.

This patent is subject to a terminal disclaimer.

(21) Appl. No.: 11/407,653

(22) Filed: Apr. 20, 2006

(65) Prior Publication Data

US 2007/0172061 A1    Jul. 26, 2007

Related U.S. Application Data

(63) Continuation of application No. 09/896,335, filed on Jun. 29, 2001, now Pat. No. 7,065,213.

(51) Int. Cl.
*H04L 29/06* (2006.01)

(52) U.S. Cl.
USPC ........... 380/240; 380/241; 380/216; 380/217; 713/153

(58) Field of Classification Search
None
See application file for complete search history.

(56) References Cited

U.S. PATENT DOCUMENTS

| | | | | |
|---|---|---|---|---|
| 5,504,816 A | * | 4/1996 | Hamilton et al. | 370/426 |
| 5,572,517 A | * | 11/1996 | Safadi | 380/217 |
| 5,594,492 A | | 1/1997 | O'Callaghan et al. | 348/10 |
| 5,652,795 A | * | 7/1997 | Dillon et al. | 370/431 |
| 5,684,876 A | | 11/1997 | Pinder et al. | 380/37 |
| 5,774,548 A | | 6/1998 | Bando et al. | 380/9 |
| 5,878,135 A | | 3/1999 | Blatter et al. | 380/10 |
| 6,219,422 B1 | | 4/2001 | Sato | 380/240 |
| 6,243,469 B1 | | 6/2001 | Kataoka et al. | 380/255 |
| 6,304,659 B1 | | 10/2001 | Gold et al. | 380/239 |
| 6,639,896 B1 | | 10/2003 | Goode et al. | 370/224 |
| 6,782,006 B1 | * | 8/2004 | Tanaka et al. | 713/163 |
| 7,093,277 B2 | * | 8/2006 | Perlman | 370/468 |

OTHER PUBLICATIONS

Khaled Shuaib, "Dejittering in the transport of MPEG-2 and MPEG-4 video," Oct. 2000, Multimedia Systems, vol. 8, Issue 3, pp. 231-239.*
Bruce Schneier, Applied Cryptography, 1996, John Wiley & Sons Inc, pp. 294-295.
Boroczky, Statistical Multiplexing Using MPEG-2 Video Encoders, Jul. 1999, IBM, pp. 511-519.

* cited by examiner

*Primary Examiner* — Benjamin Lanier
(74) *Attorney, Agent, or Firm* — Tarolli, Sundheim, Covell & Tummino LLP

(57) ABSTRACT

Methods of providing a transport streams are disclosed. In one embodiment, among others, a method comprises receiving an input transport stream having a plurality of packet identifier (PID) streams included therein, the plurality of PID streams comprising first, second, third, and fourth PID streams, decrypting the first PID stream, statistically multiplexing the second PID stream, encrypting the third PID stream, and transmitting the fourth PID stream, wherein the receiving, decrypting, statistically multiplexing, encrypting, and transmitting are implemented at a transport stream apparatus.

22 Claims, 8 Drawing Sheets

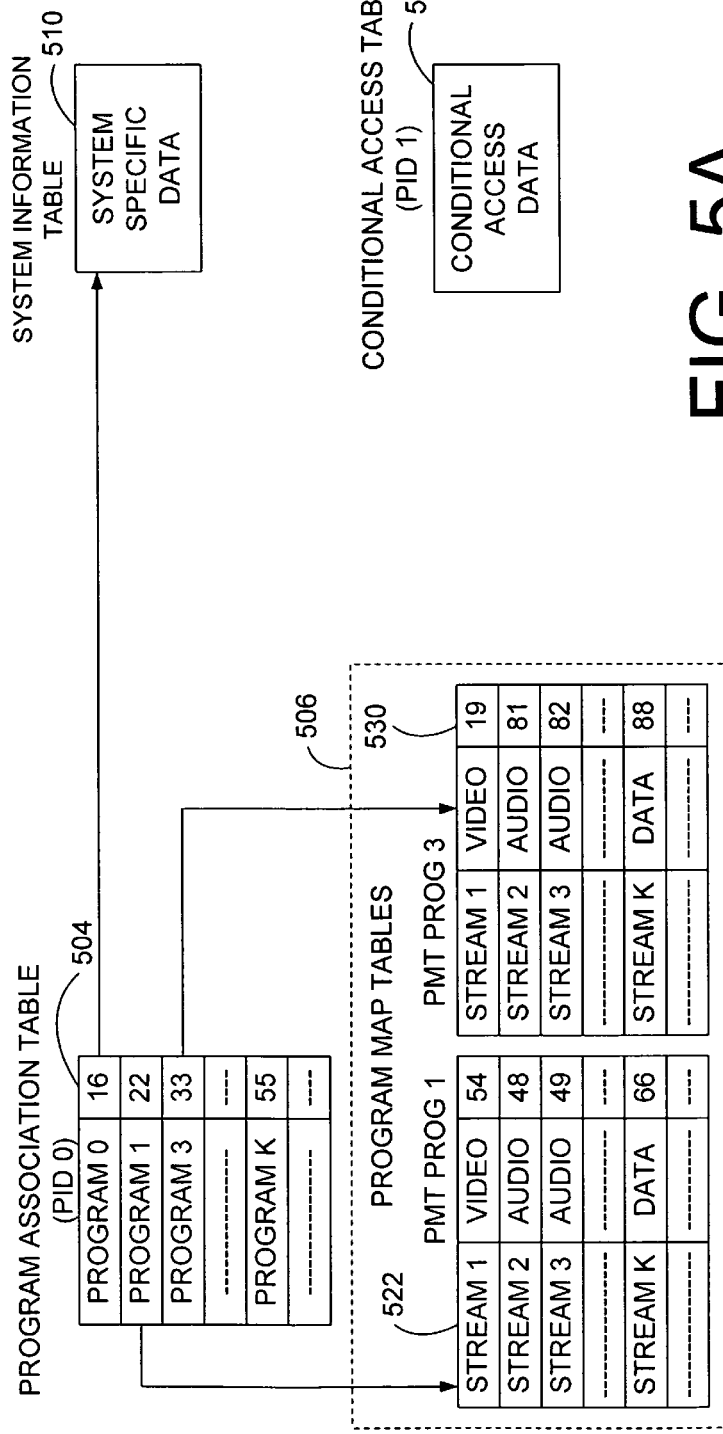
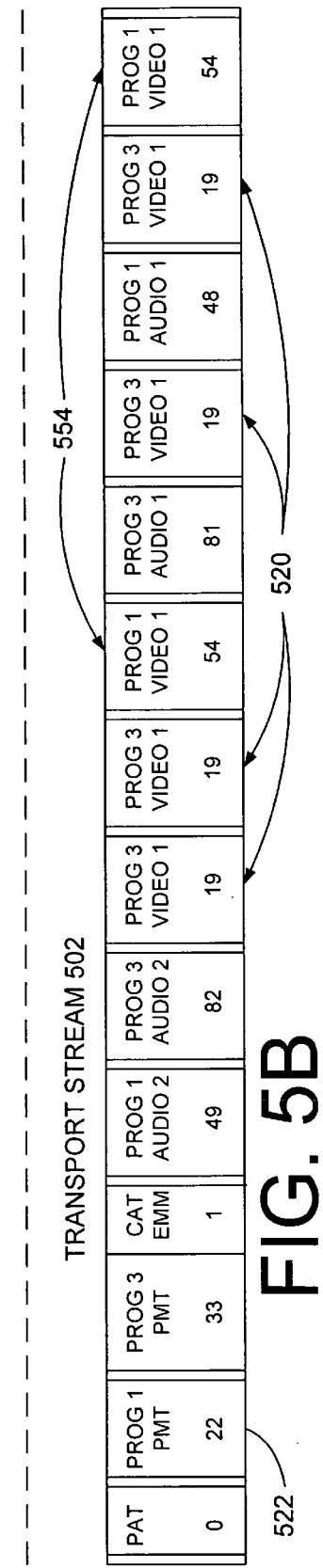
FIG. 5A
FIG. 5B

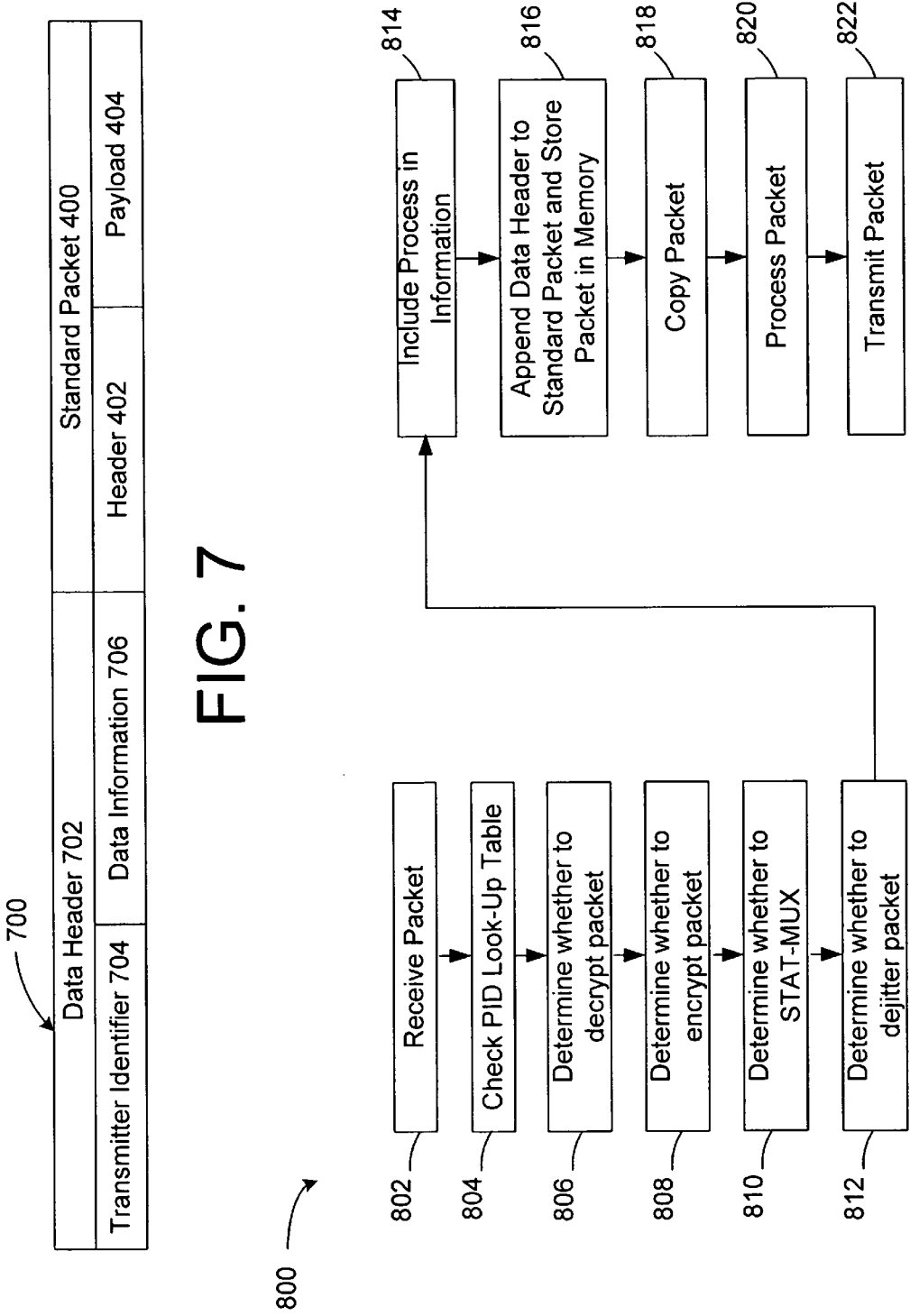

SUBSCRIBER NETWORK RECEIVING DIGITAL PACKETS AND TRANSMITTING DIGITAL PACKETS BELOW A PREDETERMINED MAXIMUM BIT RATE

CROSS-REFERENCE TO RELATED APPLICATION

This application is a continuation of copending U.S. utility application entitled, "IN A SUBSCRIBER NETWORK RECEIVING DIGITAL PACKETS AND TRANSMITTING DIGITAL PACKETS BELOW A PREDETERMINED MAXIMUM BIT RATE," having Ser. No. 09/896,335, filed Jun. 29, 2001 now U.S. Pat. No. 7,065,213, which is entirely incorporated herein by reference.

FIELD OF THE INVENTION

This invention relates generally to broadband communications systems, such as subscriber television systems and the equipment of the digital headend and hubs within such systems, and more specifically to receiving and transmitting digital packets within the broadband communication system.

BACKGROUND OF THE INVENTION

Frequently, broadband systems transmit television signals to subscribers of a conditional access system. Broadband systems, such as cable and satellite television systems, typically include a headend for receiving programming, or sessions, and/or data from various sources and redistributing the programming and other data through a distribution system to subscribers. The headend receives programming signals from a variety of sources, combines the programming signals from the various sources, and transmits the combined signals through the distribution system to subscriber equipment. The distribution system can include a variety of media, such as coaxial cable, fiber optic cable, and satellite links. In a subscriber television system, the subscriber equipment, which receives the signals from the headend, can include a cable-ready television, a cable-ready video cassette recorder (VCR), or a digital home communications terminal (DHCT) that is connected to a television, computer, or other display device.

The headend uses modulators to control the streams of data into the distribution system. In today's competitive market, the modulators must be able to accept data/programming from equipment manufactured by many different suppliers. Increasingly, the headend is receiving and transmitting programming in a digital format, for example, Moving Pictures Expert Group (MPEG) format, instead of an analog format. Transmitting programs in MPEG format is advantageous because multiple digitized programs can be combined and transmitted in, for example, 6 MHz of bandwidth, which is the same amount of bandwidth that is required to transmit a single analog channel or program.

MPEG transport streams include overhead information such as MPEG tables that indicate the types and location of the programming within the transport stream. In a local television system, the MPEG tables include information that is specific to that local distribution system and its particular channel line-up. MPEG as referenced in this application is described in the MPEG-1 and MPEG-2 standards. The MPEG-1 standards (ISO/IEC 11172) and the MPEG-2 standards (ISO/IEC 13818) are described in detail in the International Organization for Standardization document ISO/IEC JTC1/SC29/WG11 N (June 1996 for MPEG-1 and July 1996 for MPEG-2), which is hereby incorporated by reference. Therefore, the headend system, and the modulators in particular, must insure that the required MPEG table data is contained in the outgoing bit stream.

Content and data providers provide streams of data, data streams, that include video, audio and data, to system operators via video sources, such as video encoders and video servers. The data streams are initially prepared for transmission through the broadband system by programming, or mapping, the video, audio and data with control software within a digital network control system (DNCS), which is an element manager for processing data within the headend. The DNCS causes the data streams associated with several programs to be combined into bundled groups of sessions. More specifically, the system operator defines and maps the specifications of the individual data streams from one or several content and data providers and, for example, multiplexes them into grouped sessions in order to maximize the use of the bandwidth available within the subscriber television system.

In any broadband system there is a limited amount of bandwidth available. For example, a typical subscriber television system has a forward bandwidth of 50 Megahertz (MHz) to 870 MHz, which is divided into channels. Therefore, a limited number of modulated channels can be delivered to a particular DHCT. An example of a modulator is a quadrature amplitude modulation (QAM) modulator that receives a digital bit stream and modulates it for transmission over the subscriber television network. Typically, a channel occupies 6 MHz of bandwidth, and a QAM modulator can generally modulate and transmit data through the bandwidth at a rate of approximately 27 or 38 Mega bits per second depending upon the mode of QAM modulation used. The modulator modulates the bundled group of sessions with a particular radio frequency (RF) and the modulated signal is provided to the output port of the modulator. A combiner then combines the modulated sessions with other outputs from modulators. The combined modulated outputs are then provided downstream via a distribution network to a plurality of DHCTs. There are numerous bundled groups of sessions that can be programmed by the DNCS and provided to numerous modulators; however, each bundled group is modulated with a different frequency across all the modulators.

In a typical broadband subscriber television system, the efficiency of the system is optimized by choosing a bundled group of sessions such that the bit rate of the bundled group of session is close to, but does not exceed, the bandwidth limitation of the modulator. Typically, a bundled group of sessions includes a program or data information that has a variable bit rate, and consequently the bit rate of the bundled group of sessions cannot be precisely predetermined. Care must be taken by the operator of the system to make ensure that the bit rate for the bundled group of sessions does not exceed the bandwidth limitation of the modulator. Otherwise, a condition, which is known to those skilled in the art as macro-blocking, occurs when information from the bundled group of sessions is not transmitted from the modulator because the bit rate of the bundled group of sessions exceeds the bandwidth limitation of the modulator. One method for eliminating macro-blocking is to reduce the bit rate of the bundled group of sessions by reducing the number of sessions in the bundled group of session. Another method is to statistically multiplex the group of sessions. However, some or all of the programs or data information provided by the content providers to the subscriber television system is encrypted, and encrypted content cannot be statistically multiplexed.

SUMMARY OF THE INVENTION

An embodiment of the present invention can be viewed as providing a method for receiving a transport stream and transmitting a transport stream that has a predetermined maximum bit rate. In this regard, one embodiment of such a method, among others, can be broadly summarized by the following steps: receiving a transport stream that includes a plurality of PID streams; decrypting at least one of the received PID streams; statistically multiplexing at least one of the received PID streams; and encrypting at least one of the PID streams.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

FIG. 5, consisting of FIG. 5A and FIG. 5B, illustrates the relationship between MPEG tables and an MPEG transport stream.

FIG. 7 is a block diagram of a Data Header.

FIG. 8 is a flowchart for handling packets of a received PID stream.

DETAILED DESCRIPTION OF A PREFERRED EMBODIMENT

Embodiments of the present invention will be described more fully hereinafter with reference to the accompanying drawings in which like numerals represent like elements throughout the several figures, and in which an exemplary embodiment of the invention is shown. The present invention may, however, be embodied in many different forms and should not be construed as limited to the embodiments set forth herein; rather, the embodiments are provided so that this disclosure will be thorough and complete, and will fully convey the scope of the invention to those skilled in the art. The examples set forth herein are non-limiting examples and are merely exemplary examples among other possible examples.
Television System Overview The preferred embodiment of the invention is best understood within the context of a two-way, interactive digital subscriber television system, as an example. In this discussion, the two-way interactive digital subscriber television system is also referred to as a Digital Broadband Delivery System (DBDS). An overview of an exemplary DBDS is provided in U.S. Pat. No. 6,157,719, entitled "Conditional Access System", which is hereby incorporated by reference herein in its entirety. A function of the DBDS is to provide interfaces to content providers, entitlement agents, and services, control access to and the use of the content and services, and to distribute the content and services to subscribers. The DBDS uses Motion Picture Experts Group (MPEG) transport streams for delivery of video, audio, and digitized data entertainment services. These can include programming and services such as local television channels, premium movie channels, video-on-demand (VOD), telephone services, and Internet access.

Figure 1:
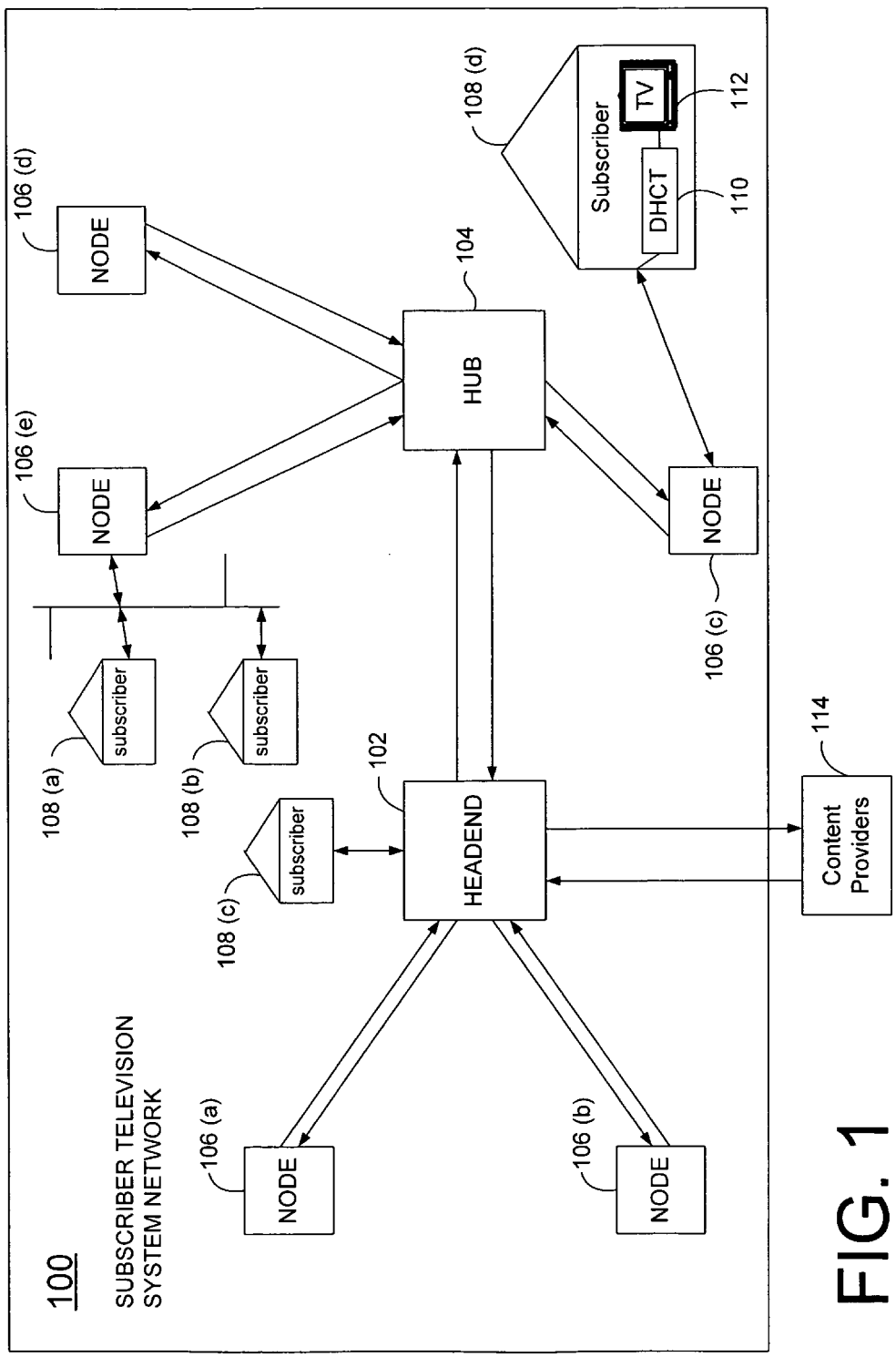
FIG. 1 is a broadband communications system, such as a cable television system, in which the embodiments of the present invention may be employed.

Referring to FIG. 1, a digital broadband distribution system (DBDS) 100 includes a headend 102, a plurality of hubs 104, multiple nodes 106, a plurality of subscriber locations 108, and a plurality of digital home communication terminals (DHCTs) 110. The headend 102 provides the interface between the DBDS 100 and service and content providers 114, such as broadcasters, internet service providers, and the like. The transmission medium between the headend 102 and the service and content providers 114 can be two-way. This allows for two-way interactive services such as Internet access via DBDS 100.

Unlike prior distribution systems, which have a main trunk and branches, the DBDS 100 includes a plurality of hubs 104 and nodes 106 that are in communication with the headend 102 via transmission medium 150. The headend 102 is in direct communication with the hubs 104. However, in alternative embodiments, the headend 102 can be in direct communication with some or all of the nodes 106 or in direct communication with some or all of the subscriber locations 108. Whether the headend 102 communicates directly with nodes 106 and/or subscriber locations 108 is a matter of implementation. The hub 104 receives programming and other information from headend 102 via transmission medium 150 and transmits information and programming via transmission medium 152 to nodes 106, which then transmit the information to subscriber locations 108 through transmission medium 154. Again, whether the hub 104 communicates directly to subscriber locations 108 or to nodes 106 is matter of implementation, and in the preferred embodiment, the hub 104 is adapted to transmit information and programming directly to subscriber locations 108 via transmission medium 154.

In the preferred embodiment, the transmission medium 150 and 152 are optical fibers that allow the distribution of high quality and high-speed signals, and the transmission medium 154 is either broadband coaxial cable or optical fiber. In alternative embodiments, the transmission media 150, 152 and 154 can incorporate one or more of a variety of media, such as optical fiber, coaxial cable, and hybrid fiber-coax (HFC), satellite, direct broadcast, or other transmission media known to those skilled in the art. Typically, the transmission media 150, 152 and 154 are two-way communication media through which both in-band and out-of-band information are transmitted. Through the transmission media 150, 152 and 154 subscriber locations 108 are in direct or indirect two-way communication with the headend 102 and/or the hub 104.

The hub 104 functions as a mini-headend for the introduction of programming and services to sub-distribution network 160. The sub-distribution network 160 includes hub 104 and the plurality of nodes 106 connected to hub 104. Having a plurality of hubs 104 that function as mini-headends facilitate the introduction of different programming, data and services to different sub-distribution networks of DBDS 100. For example, the subscriber location 108(b), which is connected to node 106(b), can have different services, data and programming available than the services, data and programming available to subscriber location 108(c), which is connected directly to headend 102, even though the subscriber locations 108(b) and 108(c) may be in close physical proximity to each other. Services, data and programming for subscriber location 108(b) are routed through hub 104 and node 106(b); and hub 104 can introduce services, data and programming into the DBDS 100 that are not available through the headend 102.

At the subscriber locations 108 a decoder or a DHCT 110 provides the two-way interface between the DBDS 100 and the subscriber. The DHCT decodes the signals for display on a display device, such as a television set (TV) 112 or a computer monitor. Those skilled in the art will appreciate that in alternative embodiments the equipment for decoding the signal can be located in a variety of equipment, including, but not limited to, a DHCT, a computer, a TV, a monitor, or an MPEG decoder.

Figure 2:
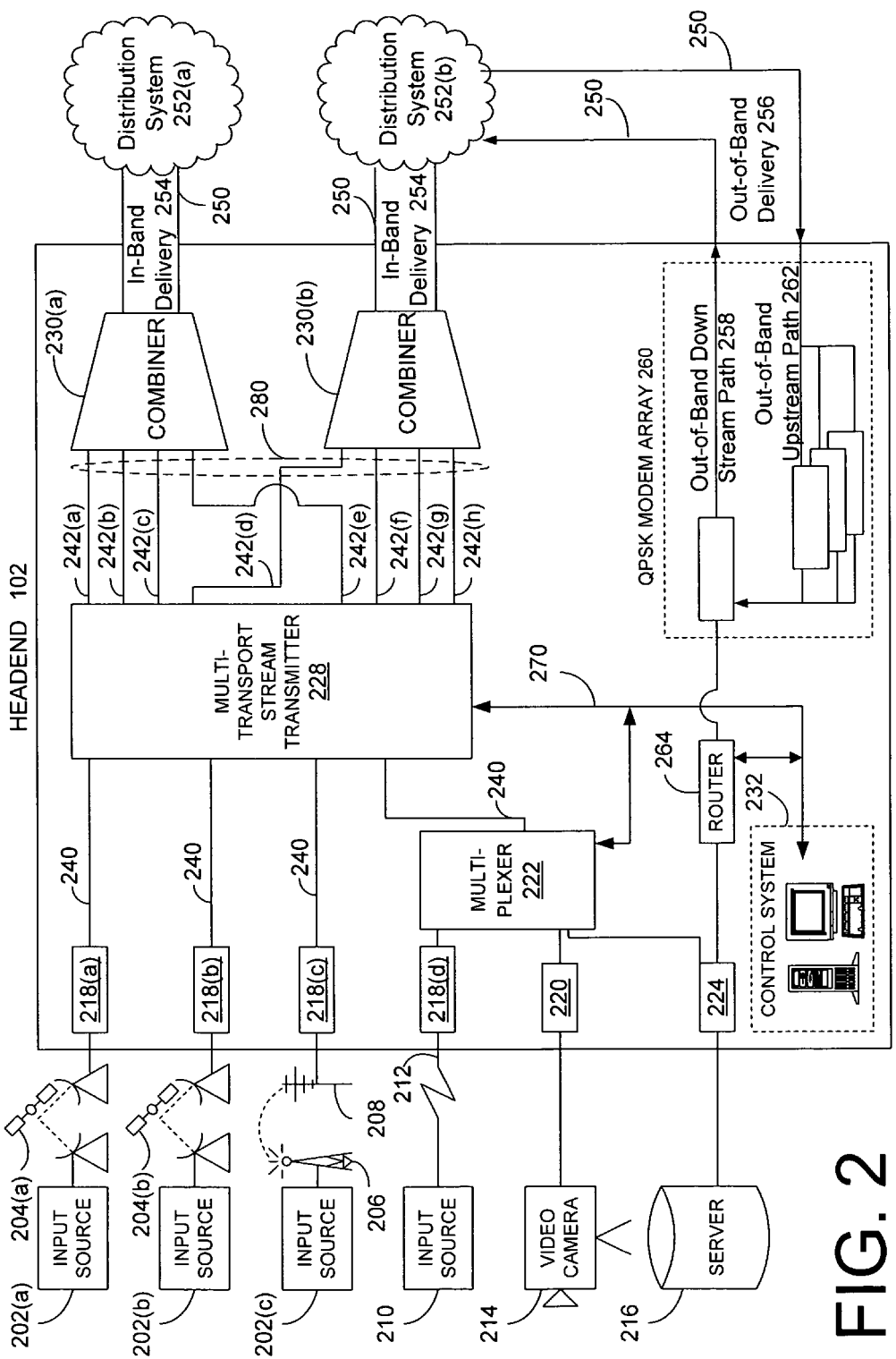
FIG. 2 is a headend in the broadband communication system in which embodiments of the present invention may be employed.

FIG. 2 is an overview of a headend 102, which provides the interface between the DBDS 100 and the service and content providers 114 (shown in FIG. 1). The headend 102 receives content from a variety of service and content providers 114, which can provide input in a variety of ways. The headend 102 combines the content from the various sources and distributes the content to subscribers via transmission medium 150.

In a typical system, the headend 102 receives content from a variety of input sources 202 and 210. The input signals may be transmitted from sources to the headend 102 via a variety of transmission paths, including satellites 204, and terrestrial broadcast transmitter and antenna, 206 and 208, respectively. The headend 102 can also receive content from a direct feed source 210 via a direct line 212. Other input sources include, but are not limited to, a video camera 214 or an application server 216. The signals provided by the content or programming input sources can include a single program or a multiplex that includes several programs, and typically, a portion of the content from the input sources is encyrpted.

The headend 102 generally includes a plurality of receivers 218 that are each associated with a content source. Generally, the content is transmitted from the receivers 218 in the form of transport stream 240. MPEG encoders, such as encoder 220, are included for digitally encoding things such as local programming or a feed from video camera 214. Typically, the encoder 220 produces a variable bit rate transport port stream. Some of the signals may require additional processing, such as signal multiplexing prior to being modulated. Such multiplexing is done by multiplexer 222.

A switch, such as asynchronous transfer mode (ATM) switch 224, provides an interface to an application server 216. There can be multiple application servers 216 providing a variety of services such as a data service, an Internet service, a network system, or a telephone system. Service and content providers 114 (shown in FIG. 1) may download content to an application server 216 located within the DBDS 100 or in communication with DBDS 100. The application server 216 may be located within headend 102 or elsewhere within DBDS 100, such as in a hub 104.

Typically, the headend 102 includes a server such as a video-on-demand (VOD) pump 226. VOD pump 226 provides video and audio programming such as pay-per-view programming to subscribers of the DBDS 100. Usually, the content from VOD pump 226 is provided in the form of transport stream 240.

The various inputs into the headend 102 are then combined with the other information, which is specific to the DBDS 100, such as local programming and control information. The headend 102 includes a multi-transport stream receiver-transmitter 228 that receives a plurality of transport streams 240 and transmits a plurality of transport streams 242. In the preferred embodiment, the multi-transport stream receiver-transmitter 228 includes a plurality of modulators, such as, but not limited to, Quadrature Amplitude Modulation (QAM) modulators, that convert the received transport streams 240 into modulated output signals suitable for transmission over transmission medium 280.

The output signals 242 from the multi-transport stream receiver-transmitters 228 are combined, using equipment such as a combiner 230, for input into the transmission medium 150, and the combined signals are sent via the in-band delivery path 254 to subscriber locations 108. It is to be understood that modulating the output signals 242 is a matter of implementation based at least in part on the transmission medium 280 that carries output signals 242. In the preferred embodiment, the multi-transport stream receiver-transmitter 228 receives a plurality of input transport streams 240, which include programs, or sessions, and outputs a plurality of radio frequency modulated transport streams 242. Details regarding the multi-transport stream receiver-transmitter 228 are provided hereinbelow.

In the DBDS 100, video, audio, and control information are encoded as program streams, which are then multiplexed to form transport streams 240. Each output transport stream from multi-transport stream receiver-transmitter 228 is modulated to a set frequency. For the DHCT 110 (shown in FIG. 1) to receive a television program, the DHCT 110 must tune to the frequency associated with the modulated transport stream that contains the desired information, de-multiplex the transport stream, and decode the appropriate program streams.

A system controller, such as control system 232, which preferably includes computer hardware and software providing the functions discussed herein below, allows the television system operator to control and monitor the functions and performance of the DBDS 100. The control system 232 interfaces with various components, via communication link 270, in order to monitor and/or control a variety of functions, including the channel lineup of the programming for the DBDS 100, billing for each subscriber, and conditional access for the content distributed to subscribers. Control system 232 provides input to the multi-transport stream receiver-transmitters 228 for setting their operating parameters, such as system specific MPEG table packet organization or conditional access information.

Control information and other data can be communicated to DHCTs 110 via an in-band delivery path 254 or to DHCTs 110 connected to the headend 102 via an out-of-band delivery path 256. The out-of-band data is transmitted via the out-of-band downstream path 258 of transmission medium 150 by means such as, but not limited to, a Quadrature Phase-Shift Keying (QPSK) modem array 260, an array of data-over-cable service interface specification (DOCSIS) modems, or other means know to those skilled in the art. Two-way communication utilizes the upstream portion 262 of the out-of-band delivery system. DHCTs 110 transmit out of band data through the transmission medium 150, and the out of band data is received in headend 102 via out-of-band upstream paths 262. The out-of-band data is routed through router 264 to an application server 216 or to control system 232. The out-of-band control information includes such information as a pay-per-view purchase instruction and a pause viewing command from the subscriber location 108 (shown in FIG. 1) to a video-on-demand type application server 216, and other commands for establishing and controlling sessions such as a Personal Television session.

The router 264 is also used for communicating with the hub 104 through transmission medium 150. Typically, command and control information among other information between the headend 102 and the hub 104 are communicated through transmission medium 150 using a protocol such as Internet Protocol. The IP traffic between the headend 102 and hub 104 can include information to and from DHCTs 110 connected to hub 104.

The control system 232, such as Scientific-Atlanta's Digital Network Control System (DNCS), also monitors, controls, and coordinates all communications in the subscriber television system, including video, audio, and data. The control system 232 can be located at headend 102 or remotely.

In an alternative embodiment, the headend 102 can include multiple sub-controllers (not shown) that are under the control of the control system 232. The sub-controllers can alleviate or reduce the processing load placed upon control system 232. Sub-controllers can, among other things, perform the functions for controlling application server 216 and VOD pump 226, managing encryption and decryption of content.

Figure 3:
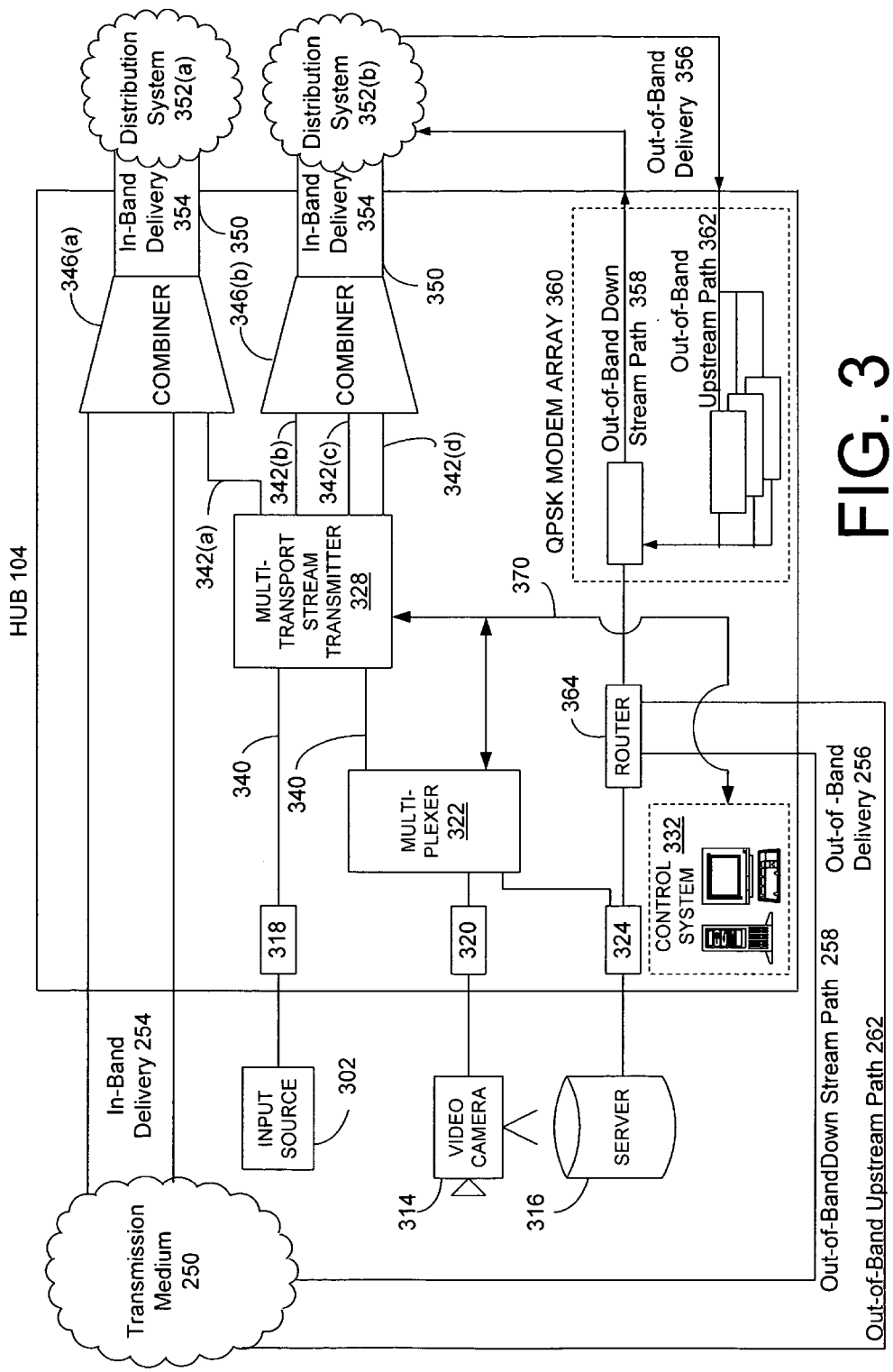
FIG. 3 is a hub in the broadband communication system in which embodiments of the present invention may be employed.

Referring to FIG. 3, the hub 104, which is remotely located from the headend 102, provides services and programming to the DHCTs 110 in a sub-region of the subscriber television system. In the preferred embodiment, the hub 104 functions as a mini-headend, and consequently, the hub 104 includes many of the same components necessary for performing the functions of the headend 102. However, it is to be understood that in alternative embodiments, the hub 104 can include less or more components than headend 102 and that the functionality of hub 104 can be different than the headend 102.

In the preferred embodiment, the hub 104 receives programming, services, and data from the headend 102 via the in-band delivery path 254 and the IP traffic through transmission medium 150. In addition, the hub 104 can receive or provide services and programming from a variety of additional sources, such as, but not limited to, an input source 302, a video camera 314, a VOD pump 326, or a sub-region application server 316.

The hub 104 includes a controller 332 that controls elements, such as multi-transport stream receiver-transmitter 328, of hub 104. The controller 332 provides instructions to the elements of hub 104 through communication link 370. The hub 104 also includes a receiver 318 that is associated with input source 302. MPEG encoders, such as encoder 320, are included for encoding such things as local programming or a video camera 314 feed. Some of the signals may require additional processing, such as signal multiplexing prior to being modulated. Such multiplexing is done by multiplexer 322.

A switch, such as ATM switch 324, provides access to the sub-region application server 316. There can be multiple sub-region application servers 316 providing a variety of services such as a data service, an Internet service, a network system, or a telephone system. Service and content providers 114 (shown in FIG. 1) may download content to a sub-distribution network 160 application server 316 via transmission medium 150. The services and programming of the sub-distribution network 160, which includes hub 104, may be orientated to the demographics of the subscribers connected to the sub-distribution network 160. This sub-region segmentation of the subscriber television system allows for very localized services and programming such as a neighborhood channel or direct advertising to a specific market segment.

The services and programming for the sub-distribution network 160, which includes hub 104, are then combined with the other information specific to the DBDS 100, such as services and programming from headend 102. The hub 104 includes multi-transport stream receiver-transmitter 328 to convert the programming information of transport streams 340 into a plurality of modulated output signals 342. The multi-transport stream receiver-transmitter 328 includes a plurality of radio frequency modulators, such as, but not limited to, Quadrature Amplitude Modulation (QAM) modulators, that prepare the formatted information for delivery via the in-band delivery path 354 of the transmission medium 152 to the subscriber locations 108 (shown in FIG. 1). The output signals 342 from the multi-transport stream receiver-transmitter 328 are combined, using equipment such as a combiners 346, for input into the transmission medium 152 via the in-band delivery path 354.

Out-of-band data is transmitted through the transmission medium 152 by means such as, but not limited to, Quadrature Phase-Shift Keying (QPSK) modem array 360, a DOCSIS modem array (not shown) via out-of-band downstream path 362. The out-of-band data is transmitted via the out-of-band downstream path 358 of transmission medium 152 by the Quadrature Phase-Shift Keying (QPSK) modem array 360. Two-way communication utilizes the out-of band up stream path 362 of the out-of-band delivery path 356. The received out-of-band information is routed through router 364 to headend 102 and application servers 316.

Router 364 provides the interface between hub 104 and headend 102 for out-of-band control information. The router 364 receives information from the headend as IP traffic through transmission medium 150 and receives out-of-band data from the DHCTs 110 through the QPSK modem array 360. In another embodiment, the hub 104 includes a control system that controls the devices in the hub 104 and interfaces with the headend 102 and with the DHCTs 110 connected to the hub 104.

Through the transmission medium 152 the signals from the hub 104 are distributed to the nodes 106 and to subscriber locations 108 (shown in FIG. 1) via transmission medium 154. The transmission medium 152 can incorporate one or more of a variety of media, such as optical fiber, coaxial cable, hybrid fiber-coax, satellite, direct broadcast, or other transmission media. An example of a DBDS 100 incorporating multiple varieties of media would be the transmission media referred to as hybrid fiber-coax that includes a transmission medium 150 incorporating fiber-optical cabling and a transmission medium 152 incorporating coaxial cabling. An alternative example of a DBDS 100 incorporating multiple varieties of media includes a transmission medium 150 incorporating fiber-optical cabling from the head end 102 to the node 106 and incorporating coaxial cabling from the node 106 to the subscriber location 108.

With multiple places to introduce services and programming, the control system 232 (shown in FIG. 2) for the subscriber television system must coordinate and control the services and programming available to each DHCT. A service group defines a group of DHCTs that receive services and programming from the same modulators. Therefore, the same services and programming are available to all the DHCTs in a service group, even if some subscribers do not subscribe to the same services and programming.

Moving Pictures Experts Group (MPEG) Overview

Figure 4:
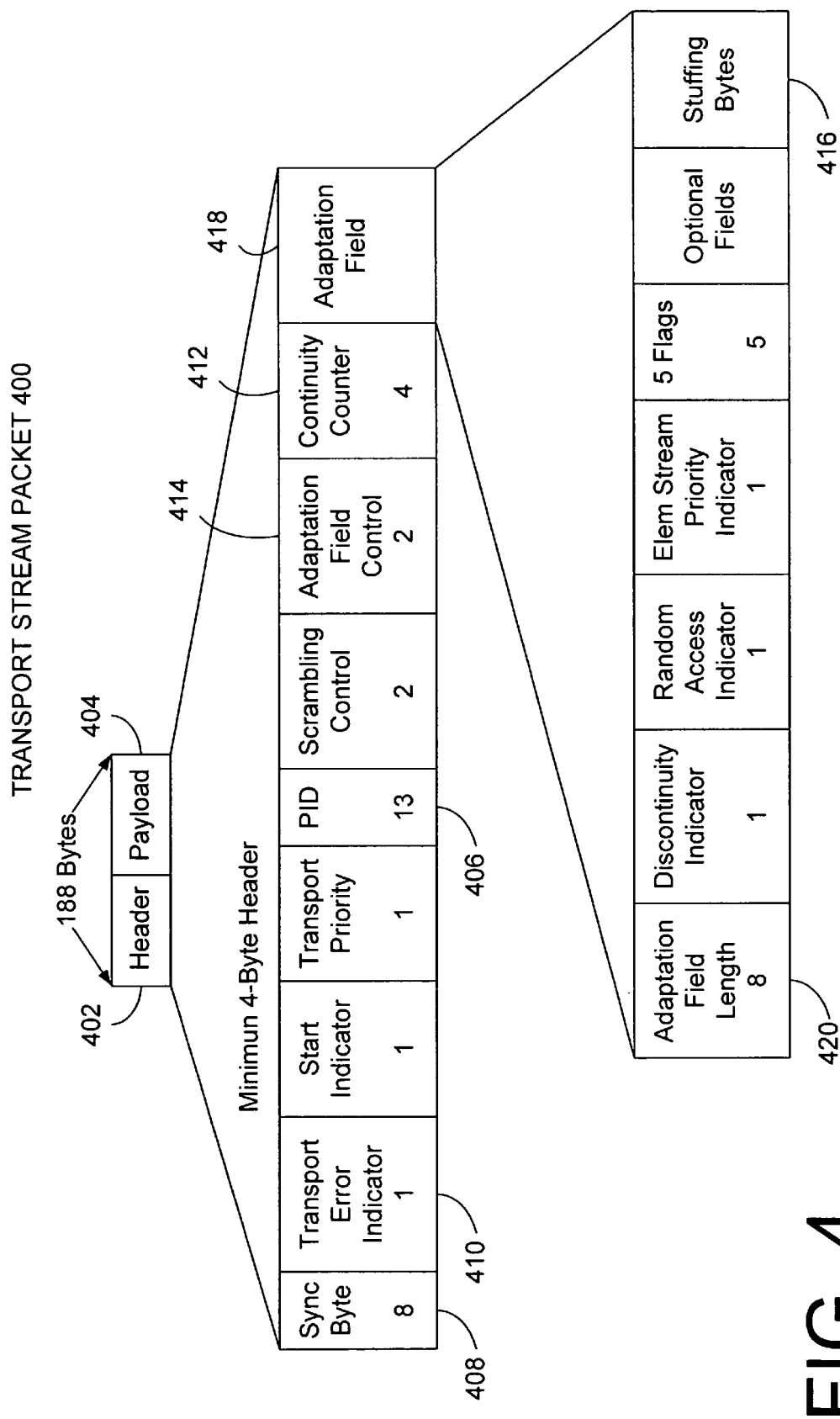
FIG. 4 is a block diagram representation of an MPEG transport packet.

The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1 and MPEG-2 standards are hereinafter referred to as MPEG. In an MPEG encoded transmission, programming and other data are transmitted in packets, which collectively make up a transport stream. An MPEG transport stream includes video packets, audio packets, data packets and table packets, which provide information about the organization of the transport stream and about any conditional access scheme that is used. Additional information regarding transport stream packets, the composition of the transport stream, types of MPEG tables and other aspects of the MPEG standards are described below. In addition, FIG. 4 and FIGS. 5A and 5B provide a graphical representation of MPEG information. In an exemplary embodiment, the present invention employs MPEG table packets. However, the present invention is not so limited, and can be implemented using other types of data.

As mentioned above, an MPEG transport stream is made of packets, where each packet is identified by a packet identifier (PID). Generally, a single program includes a plurality of elementary streams or PID streams; each packet of a PID stream has common PID value. The elementary streams of a single program or session includes video packets, audio packets and associated data packets. All of the video packets associated with a given program or session included in a transport stream will have the same PID. It is possible that a given program will include a plurality of audio options. For example, a given program might be provided to the user in English, Spanish and German, in which case the program will include three sets of audio packets and each set of audio packets will have a unique PID value in the transport stream. In general, table packets are used to indicate which packets are associated with each program in the transport stream. Additional information regarding the makeup of an MPEG transport stream and its various components is provided below.

Packetized Elementary Stream (PES)

The output of a single MPEG audio or video encoder 220 (of FIG. 2) is an Elementary Stream, which is an endless, near-real-time signal. The Elementary Stream is broken into packets in what is referred to as a Packetized Elementary Stream (PES). These packets include header information to identify the start of the packets and must include time stamps because packetizing disrupts the time axis.

Program Stream (PS)

One video PES and a number of audio PESs can be combined to form a Program Stream (PS), provided that all of the encoders are locked to a common clock. Time stamps in each PES ensure correct correlation or lip-sync between the video and audio.

Transport Stream Packet

A Transport Stream is a multiplex that includes several Program Streams, which are transported in fixed size, 188 byte, transport stream packets 400 (FIG. 4). FIG. 4 illustrates a transport stream packet 400, including a minimum 4 Byte header 402 and a payload 404. The header 402 is further expanded to illustrate the parts thereof. The numbers at the bottom of the cells, such as the 8 in Sync Byte field 408, indicate the fixed bit size of the cell. Cells with no number, such as payload 404, do not have a fixed size. In header 402, the most important information is:

Sync byte cell 408, which is recognized by a de-multiplexer or decoder so that alignment to the start of a packet can be determined.

Transport error indicator cell 410, which is set if the error correction layer above the transport layer is experiencing a raw bit error rate (BER) that is too high to be correctable. It indicates that the packet may contain errors.

Packet Identifier (PID) cell 406, which is a thirteen-bit code used by a de-multiplexer or decoder to distinguish between different types of packets.

Continuity counter cell 412, which is a four-bit value that is incremented by the encoder as each new packet having the same PID, is sent. It is used to determine if any packets are lost, repeated, or out of sequence.

Header 402 also includes a start indicator cell, a transport priority cell, a scrambling control cell, an adaptation field control cell 414, and an adaptation field cell 418. Included within the adaptation field cell 418 is an adaptation field length cell 420, a discontinuity indicator cell, a random access indicator cell, an elementary stream priority indicator cell, a 4 flags cell, an optional fields cell, and a Stuffing Bytes cell 416.

In some cases more information is needed in header 402. The header can be expanded using adaptation field cell 418. If header 402 is expanded, payload 404 becomes smaller to maintain the fixed packet size of 188 bytes.

Stuffing Packets

When the required bit rate or packet size is less than the fixed bit rate or fixed packet size, the excess capacity is filled by inserting stuffing. Stuffing can be used in two ways, as stuffing bytes or as a stuffing packet. Stuffing bytes can be used with a partial payload to fill up the remainder of transport stream packet 400 to maintain the fixed packet size. Stuffing bytes can be in the payload 404 or in the Stuffing Bytes cell 416 of an expanded header 402. A stuffing packet, a transport streams packet 400 with only a header and stuffing, can be used in a fixed rate bit stream to maintain the fixed bit rate. The stuffing packet is used to fill unused or excess capacity. PID value of 8191 or thirteen 1's always identifies stuffing packets. Demultiplexers and decoders ignore packets thus identified as stuffing packets. The content of a stuffing packet can be all ones (1), all zeros (0), or pseudo-random 1s and 0s.

Transport Stream (TS)

Referring to FIGS. 5A and 5B, several programs and their associated PESs are multiplexed to form a single Transport Stream (TS) 502 (FIG. 5B). A Transport Stream 502 differs from a Program Stream in that the PES packets are further subdivided into short fixed-size (i.e., 188 byte) transport stream packets 400 and in that multiple programs encoded with different clocks can be carried in the transport stream. This is possible because a transport stream 502 has a session clock reference (PCR) mechanism that allows transmission of multiple clocks.

The fixed-size transport stream packets 400 of Transport Stream 502 each contain 188 bytes. Many different programs streams are multiplexed in the transport stream 502. Program streams are made up of a plurality of video, audio, data and other streams, or PID streams. Each PID stream is made up of a stream of packets having a common PID value.

In advanced applications, each program may use a different compression factor and a bit rates that can change dynamically even though the overall bit rate for Transport Stream 502 stays constant. Statistical multiplexing allows a program temporarily requiring a larger bandwidth to borrow bandwidth from a program that is not using all of its allocated bandwidth. In addition, each video PES could have a different number of audio and data PESs associated with it. With this flexibility in the make-up of Transport Stream 502, a decoder or demultiplexer must be able to change from one program to the next and correctly select the appropriate audio and data channels. MPEG tables described herein below facilitate this changing and selecting.

A Transport Stream 502 is more than just a multiplex of audio and video packets. In addition to the compressed audio, video, and data, Transport Stream 502 includes a great deal of information that describes the bit stream. This information is found in MPEG tables such as Program Specific Information tables or System Information tables, which describe the relationships of the MPEG packets and identify their corresponding packet identifier (PID) value. Each packet carries a PID 406 (see FIG. 4) located in the packet header 402. The MPEG tables list the PIDs for all packets associated with a particular program. The decoder or demultiplexer uses the PIDs to change from one program to the next and correctly select the appropriate audio and data channels.

FIG. 5A and FIG. 5B, illustrates the relationship between the transport stream 502, the MPEG packets and tables therein, and the function of PIDs. Illustrative of the function of PIDs, they can be used to locate the associated tables in FIG. 5A or the corresponding packets in FIG. 5B.

FIG. 5A, represents the different MPEG tables in the MPEG transport stream 502. For example, Program Association Table 504, which is a packet in transport stream 502 that is identified by a PID having a value of 0, indicates that all packets with a PID value of 22 are Program Map Tables (PMT) associated with program 1. The PMT 522, which has a PID value of 22, indicates the PIDs of the MPEG packets 400 that make up the various components of the program stream associated with program 1. For the purposes of this disclosure a program stream is made up of the packets identified in a PMT packet.

FIG. 5B, represents the MPEG packets 400 found in a typical MPEG transport stream 502. The MPEG packets 400 are labeled and display their corresponding PID values. The PIDs can identify an associated table of FIG. 5A. For example, in FIG. 5B, the packet 522, which has a PID value of 22, corresponds to the PMT 522 of FIG. 5A.

Program Specific Information (PSI)

A demultiplexer or decoder can correctly select packets only if it can correctly associate them with the transport stream 502 to which they belong. A demultiplexer or decoder can do this task only if it knows what the right PIDs are. This is the function of the Program Specific Information (PSI) tables.

The PSI includes the Program Association Table (PAT) 504, the Conditional Access Table (CAT) 508, and the Program Map Table (PMT). In FIG. 5A two PMTs are shown, Program 1 PMT 522 and Program 3 PMT 530.

The PSI tables are carried in packets having unique PIDs; some of which are standardized and some of which are specified by the PAT 504 and the CAT 508. These table packets must be repeated periodically in every transport stream. The PAT 504 always has a PID of 0, the CAT 508 always has a PID of 1, and stuffing packets always have a PID of 8191. These are the only fixed PIDs in the MPEG system. The demultiplexer or decoder must determine all of the remaining PIDs by accessing the appropriate table(s).

The Program Association Table (PAT) 504 lists every program in transport stream 502. The PAT 504 identifies the PID values for the packets containing the associated Program Map Tables (PMT) 506 for the programs included in transport stream 502. For example, PAT 504 identifies all packets with PID 22 as being a PMT 522 associated with program 1.

The video, audio and data elementary streams that belong in the same program stream are listed in a PMT 506 with their associated PIDs. For example, PMT 522 lists a video stream, two audio streams, a data stream, and other elementary streams belonging to program 1. PMT 522 also identifies the associated PID values for each PID stream of program 1, such as the PID value of 54 for all program 1 video streams.

In FIG. 5A, the PAT 504 associates the PID value of 33 with all program 3 PMT 530 packets. In the corresponding PMT 530, elementary stream 1 identifies as a video stream all packets with a PID value of 19. All program 3 video 1 packets, in transport stream 502, have PID value of 19 as indicated by arrows 520 of FIG. 5B. PMT 522 indicates that all video packets associated with program 1 have a PID value of 54. Arrows 554 in transport stream 502 of FIG. 5B indicate these packets. The decoder (or a demultiplexer) can select all data for a given elementary stream by accepting only packets with the right PID value, such as a PID value of 19 for elementary stream 1 video, and rejecting the remainder. Data for an entire program can be selected using the PID values in a PMT. For example, for the entire program 3, using PMT 530, select all video packets with a PID value of 19, audio packets with a PID value of 82 and data packets with a PID value of 88. Packet-continuity counts ensure that any loss of a packet that is needed to decode a stream is detected.

Some or all of the programs are protected or tiered so that those who have paid a subscription or fee can only view them. The transport stream 502 contains conditional access information, Conditional Access Table (CAT) 508, to administer this protection, located at PID 1 and labeled EMM in transport stream 502. The PIDs for Entitlement Management Messages (EMM) are listed in the CAT 508 packets (PID=1).

Consequently, if the decoding of a particular program is required, reference to the PAT 504 and then a PMT 506 is all that is needed to find the PIDs of all of the elementary streams in the program. If the program is encrypted, then access to the CAT 508 may also be necessary.

The first entry in the PAT 504, session 0, indicates the PID of the System Information Table 510.

System Information Table

A given System Information Table 510 contains details of more than just the transport stream 502 carrying it or the PSI of the transport stream. The System Information Table 510 may also include details of other transport streams that may be available to the same decoder, for example, by tuning to a different RF channel or steering a dish to a different satellite. The System Information Table 510 may list a number of other transport streams and each one may have a descriptor that specifies the radio frequency, orbital position, and so on. System Information Table 510 provides information describing the overall system signal(s) of a specific television system 100.

Types of a System Information Table 510 include a Digital Video Broadcast (DVB) standard Network Information Table (NIT) and an Advanced Television Systems Committee (ATSC) standard System Information (SI) table. DVB and ATSC transport streams may also contain additional service information.

Those skilled in the art will appreciate that FIGS. 4-6 are intended to provide a brief, general description of a typical television system and MPEG encoded data, and that additional information is readily available from a variety of sources.

Multi-Transport Stream Receiver-Transmitter

The logic of the present invention can be implemented in hardware, software, firmware, or a combination thereof. In the preferred embodiment, the logic is implemented in hardware, which can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the logic is implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

As previously shown hereinabove, the multi-transport stream receiver-transmitter can be located in various locations within the DBDS 100, such as the headend 102 and hubs 104. Although the multi-transport stream receiver-transmitter is described hereinbelow as located in the headend 102, it is to be understood that this is merely for exemplary purposes and that alternative embodiments, which have the multi-transport stream receiver-transmitter located at different locations, are intended to be within the scope of the present invention.

Figure 6A:
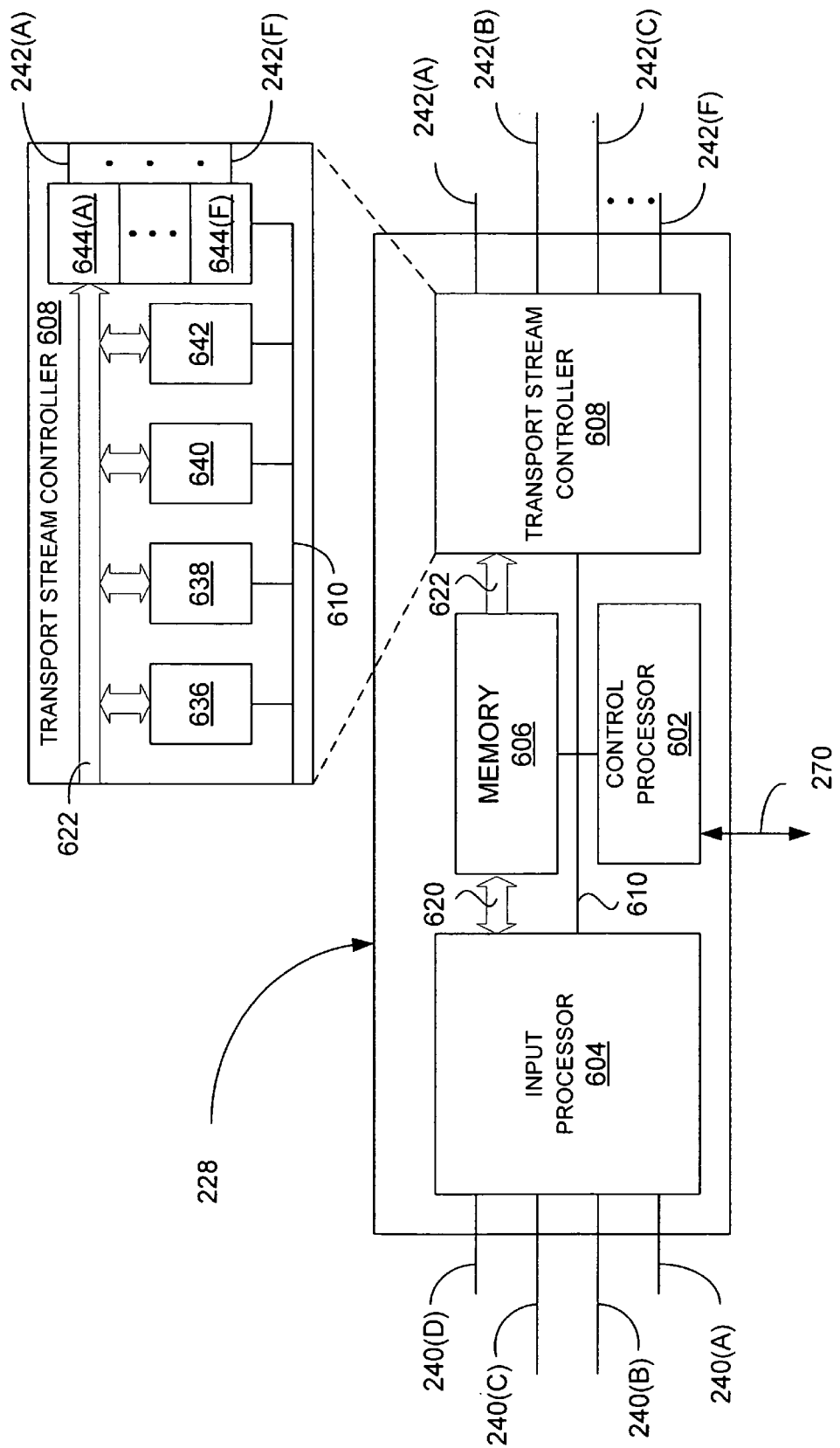
FIG. 6A is a block diagram of the multi-transport stream receiver-transmitter's functional components.

Referring now to FIG. 6A, in the preferred embodiment the multi-transport stream receiver-transmitter 228 includes a central processor 602, an input processor 604, a memory 606, and a transport stream controller 608. The control processor 602 receives messages from the DNCS 232 through communication link 270. The DNCS 232 provides the control processor 602 with decrypt keys that are used to decrypt programs included in the input transport streams 240 and with encrypt keys that are used to encrypt programs included in output transport streams 242. In an alternative embodiment, the DNCS 232 controls an apparatus (not shown), which includes the functionality necessary for providing the multi-transport stream receiver-transmitter 228 with encryption keys, and a device (not shown), which includes the functionality necessary for providing the multi-transport stream receiver-transmitter 228 with decryption keys. The DNCS 232 also sends information to the control processor 602 about the input transport streams 240, for example, the DNCS 232 tells the control processor 602 to dejitter transport stream 240(A), which came from multiplexer 222. The DNCS 232 orders the dejittering of transport stream 240(A), because transport stream 240(A) includes PID streams from switch 224, and switches and routers frequently send packets in groups or batches, thereby introducing jitter in their output PID streams. Typically, the operator of the DBDS 100 determines which transport streams 240 are to be dejittered based at least in part on the devices that have produced and processed the transport streams, and then the operator instructs the DNCS 232 to order the dejittering of the appropriate transport streams.

The DNCS 232 also sends program messages to the control processor 602. Generally, the program messages indicate that a given program included in a particular transport stream is to be included in a specific output transport stream 242, for example, a program message might indicate that program 1, which includes video PID stream 54 and audio PID streams 48 and 49 (see FIG. 4B), of transport stream 240(A) is to be included in output transport stream 242(F). Typically, the program messages from the DNCS 232 also include decryption and encryption information, such as identifying the particular keys that are used for decrypting and encrypting the program. Alternatively, the DNCS 232 can tell the control processor 602 to decrypt a program, such as program 1 of transport stream 240(A), and to transmit the program in the clear, i.e., without encryption. Alternatively, the DNCS 232 can tell the control processor 602 to encrypt a program that was received in the clear. In an embodiment, the various PID streams of a program stream are encrypted with different keys, for example, the video PID stream 10 of program 1 is encrypted with a key that is different from the key used to encrypt the audio PID stream 48 of program 1.

In addition, the DNCS 232 can send a program message that tells the control processor 602 to add, or drop, a particular program to, or from, a given output transport stream 242; for example, a program message might indicate that program 1 of transport stream 240(A) is added to output transport stream 242(B), and another program message might indicate that program 5 of 240(B) is dropped from output transport streams 242(B) and 242(N). The number of programs that can be included in a given output transport stream depends in part on the bandwidth limitation of the transmitter that transmits the given output transport stream and upon bit rate of each of the programs in the given transport stream. Generally, the number of programs in a transport stream is chosen such that the bit rate of the transport stream is close to a predetermined maximum such as the bandwidth limitation of a transmitter.

In the preferred embodiment, the DNCS 232 associates PID streams that are included in input transport streams 240 into groups of PID streams, which are included in output transport streams 242. The DNCS 232 sends the control processor 602 program messages that associate a program included in an input transport stream with at least one output transport stream 242. The DNCS 232 also sends program messages to the control processor 602 that indicate a PID stream, which is included in a group of PID streams, is to be statistically multiplexed. Generally, a plurality of PID streams, which are included in the same group of PID streams, are statistically multiplexed together, and usually, the statistically multiplexed PID streams are variable bit rate PID streams.

The program messages from the DNCS 232 to the multi-transport stream receiver-transmitter 228 are intended to, among other things, enable the multi-transport stream receiver-transmitter 228 to efficiently transmit transport streams 242. Frequently, the input transport streams 240 include data information or programs that are encrypted and variable bit rate programs, which may or may not be encrypted. To efficiently utilize the bandwidth of DBDS 100, the content of the output transport streams 242 is statistically multiplexed. However, encrypted content cannot be statistically multiplexed, and therefore, some or all of the content of input transport streams 240 is decrypted, statistically multiplexed and transmitted from multi-transport stream receiver-transmitter 228 in output transport streams 242. Generally, some or all of the content included in the output transport stream(s) 242 is encrypted before the content is transmitted.

Figure 6B:
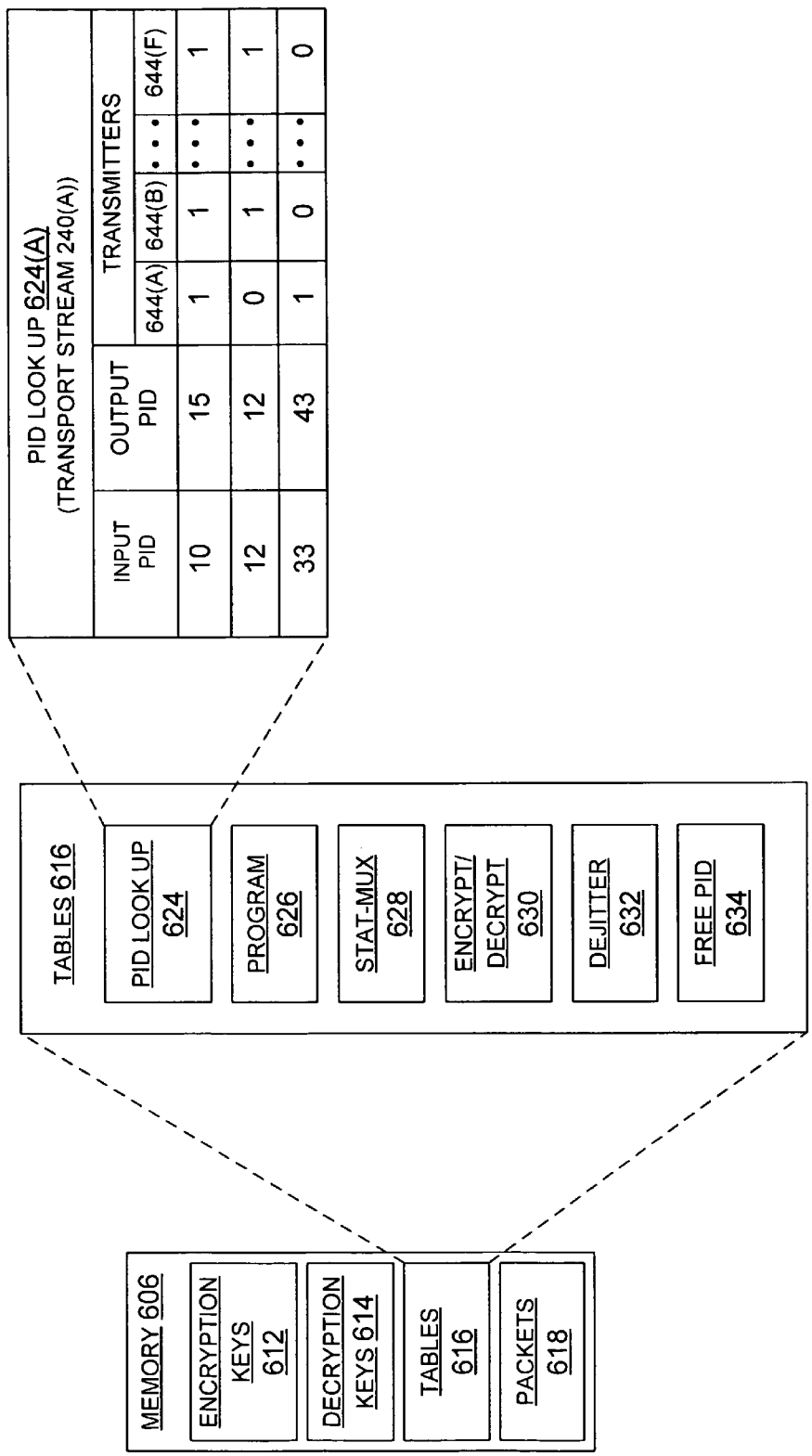
FIG. 6B is a diagram of the memory of the multi-transport stream receiver-transmitter.

Referring to FIG. 6B, the memory 606 has a plurality of encryption keys 612, a plurality of decryption keys 614, a plurality of tables 616 stored therein and packet partition 618. The plurality of encryption keys 612 and decryption keys are received from the control processor 602 through communication link 610, and the decryption and encryption keys are used for decrypting and encrypting packets of the input transport streams 240 and the output transport streams 242, respectively. Generally, the decryption keys 614 and the encryption keys 612 are symmetric keys, such as 3DES keys.

The memory 606 also includes packet partition 618 for storing packets that were received from input processor 604 through communication link 620. The packets are sent to the transport stream controller 608 through communication link 622 where they are included in at least one output transport stream 242. In the preferred embodiment, packets of an input transport stream 240 are included in a plurality of output transport streams 242.

The memory 606 also includes a plurality of tables 616 that the input processor 604 uses for determining how to process and handle packets 400 received in input transport streams 240. In the preferred embodiment, the control processor 602 maintains the tables 616, which include PID look-up tables 624, program tables 626, STAT MUX tables 628, encrypt/decrypt tables 630, dejitter tables 632 and free PID tables 634 among other tables. However, in an alternative embodiment, the control processor 602 maintains fewer or more tables that are used by the input processor 604 for determining how to process and handle received packets.

In the preferred embodiment, the control processor 602 maintains a PID look-up table 624 for each input transport stream. The PID look-up table 624(I), which is associated with input transport stream 240(I), associates PID streams of input transport stream 240(I) with PID streams of the output transport streams 242, where "I" is a variable used to denote A, B, C or D; for example, PID look-up table 624(A), which is associated with input transport stream 240(A), associates input PID stream 10 with transmitters 644(A), 644(B) and 644(F). The PID look-up table 624(A) also shows that the PID value of the input transport stream is remapped to a PID value of 15 when the PID stream is transmitted from the transmitters 634. In another embodiment, each transmitter 634 identified in the PID look-up table 624(A) has an output PID value associated therewith. In that case, the output PID values for a given transport stream can be the same or different for each output PID stream.

In yet another embodiment, a portion of memory 606 is a content addressable memory (CAM), which is maintained by processor 602. The CAM associates a memory pointer for an active input PID stream with the PID value of the active input PID stream and with the input transport stream having the active input PID stream. For the purposes of this disclosure, an active input PID stream is an input PID stream having packets that are transmitted from one or more transmitters 634. When the input processor 604 receives a packet in a given input transport stream, which has a transport stream identifier associated therewith, the input processor 604 uses the PID value of the packet and the transport stream identifier to find a memory pointer in the CAM for the packet. If there is no pointer, then the packet is not transmitted from the multi-transport stream transmitter 228, and the packet is discarded. On the other hand, when the packet is transmitted from the multi-transport stream receiver-transmitter 228, the CAM includes a memory pointer for the packet. The memory pointer is associated with a location of the memory 602, which is associated with processing information for the packet. The processing information includes information such as, but not limited to, the output PID value, dejitter information, decryption information, encryption information and statistical multiplexing information.

In the preferred embodiment, the control processor 602 also maintains a program table 626 for each input transport stream 240. The program table 626 for a given input transport stream 240 identifies the programs of that transport stream that are currently being transmitted downstream from the multi-transport stream transmitter. The program table 626 also includes a transport stream counter, which indicates the number of output transport streams 242 having the program included therein; for example, program table 626(A) (not shown), which is associated with input transport stream 240 (A), indicates that program 1, which includes input PID stream 10, is currently being transmitted from three transmitters. Programs in program table 626(A) are added or dropped from the program table in response to program messages from the DNCS 232. In an alternative embodiment, the control processor maintains a program table 626 for all of the input transport streams 240.

In the preferred embodiment, the control processor 602 also maintains a STAT MUX table 628, a encrypt/decrypt table 630, and a dejitter table 632 for each input transport stream 240. The STAT MUX table 628(A) (not shown), which is associated with transport stream 240(A), indicates which PID streams of transport stream 240(A) are to be statistically multiplexed. The encrypt/decrypt table 630(D) (not shown), which is associated with the transport stream 240(D), indicates which PID streams of transport stream 240(D) are to be decrypted and/or encrypted and includes pointers to the appropriate decrypt keys 614 and encrypt keys 612. The dejitter table 632(C) (not shown), which is associated with transport stream 240(C), indicates which of the PID streams of transport stream 240(C) are to be dejittered. In an alternative embodiment, the control processor 602 maintains a STAT MUX table 628, a encrypt/decrypt table 630, and a dejitter table 632 for all of the input transport streams 240.

In the preferred embodiment, the control processor 602 maintains the PID look-up table 624, the program table 626, the STAT MUX table 628, the encrypt/decrypt table 630 and the dejitter table 632 using program message or messages from the DNCS 232. When the DNCS 232 sends a program message that starts a session, the control processor adds the program identified in the program message to the program table 626 and increments the transport stream counter that is associated with the program. When the transport stream counter is set to 1, the PAT of the transport stream identified by the program message is extracted and used for determining the PMT for the program identified by the program message; from the PMT of the program the PID streams of the program are determined; and the PID look-up table 624 is updated to include the PID values of the PID streams of the program. When the DNCS 232 sends a program message to the control processor 602 ending a session, the control processor 602 decrements the transport stream counter associated with the program identified in the program message. If the transport stream counter is zero, then the associated program is removed from the program table 630 by the control processor 602. When a program session is started, or ended, the control processor 602 updates the PID look-up table to associate, or disassociate, a transmitter, which was identified in the program message with the PID streams of the program identified in the program message.

In addition to program messages that start, or end, a session, the control processor 602 receives from the DNCS 232 program messages that identify a program or PID stream and instructions for processing the program or PID stream, such as decryption/encryption instructions, dejittering instructions and/or statistical multiplexing instructions. The control processor 602 reads the program messages and updates and maintains the table 616 according to the received instructions.

The control processor 602 also maintains free PID table 634, which includes all PID values that are not currently assigned to output PID streams included in output transport streams 242. In one embodiment, when the DNCS 232 tells the control processor 602 to start a session for a given program, the control processor 602 automatically remaps the PID values for the PID streams associated with the given program, for example, the DNCS 232 sends the control processor 602 a message saying that program 50 of transport stream 240(A) is to be included in output transport stream 242(D). The control processor 602 consults the program table 626(A), which is associated with the transport stream 240(A), and determines therefrom whether program 50 is currently included in any output transport stream 242. If program 50 is currently included in any of the output transport streams 242, then the control processor 602 increments the transport stream counter for program 50. On the other hand, if program 50 is not included in program table 626(A), the control processor 602 adds program 50 to program table 626(A) and sets the transport stream counter associated with program 50 to 1. The control processor 602 then uses the PAT of transport stream 240(A) to determine the PMT of program 50. From the PMT of program 50, the control processor 602 identifies each PID stream of program 50 and includes the PID values of the PID streams of program 50 into the PID look-up table 624(A), which is associated with input transport stream 240(A). The control processor 602 also uses the free PID table 634 to assign a set of PID values to the PID streams of program 50. In the preferred embodiment, the PID values that are assigned to the PID streams of program 50 are unique; if the PID streams of program 50 are included in a plurality of output transport streams 242, then the output PID streams of program 50 shall have the same set of PID values in each output transport stream, for example, the video PID stream and the audio PID stream of program 50 could be assigned the PID values 25 and 26, respectively, for all output PID streams 242 that include program 50. An advantage to remapping the PID values of the input PID streams of a program to a unique set of PID values is that it prevents PID collisions between two or more programs. A PID collision occurs in a transport stream, when one or more PID streams of a program have the same PID values as one or more PID streams of a different program.

Referring again to FIG. 6A, in the preferred embodiment, the input processor 604 receives a plurality of input transport streams 240, each of which usually includes a plurality of PID streams. Although, the input processor 604 is shown receiving four input transport streams 240(A)-240(D), it is to be understood that the number of input transport streams is a matter of implementation and that more or fewer input transport streams are intended to be within the scope of the invention. Furthermore, in the preferred embodiment, the input processor 604 is adapted to interface with various communication protocols such as, but not limited to, a synchronous serial interface (ASI) and ethernet protocols.

As will be described in greater detail hereinbelow, the input processor 604 receives standard MPEG packets 400, which are included in input transport streams 240, and uses table 616 to determine how to process, or drop, the received packets. The receive packets that the input processor determines to process are sent to memory 606 through communication link 620.

The transport stream controller 608 includes a decryptor 636, a dejitterer 638, a statistical multiplexer 640, an encryptor 642 and a plurality of transmitters 644, which are coupled to communication link 622. The transport stream controller 608 receives data control packets 700, shown in FIG. 7, from memory 606 through communication link 622. The data control packet 700, which includes a standard packet 400, are processed by various elements of the transport stream controller 608 and transmitted therefrom.

Details by which the various elements of transport stream controller 608 process data control packet 700 are provided hereinbelow.

The decryptor 636 receives data control packet 700 through communication link 622 and decrypts at least the payload portion 400 of the standard packet 400. The decryptor 636 uses a decryption key 614 that is associated with the control packet to decrypt the payload portion.

The dejitterer 638 receives data control packet 700 that have a dejitter indicator associated therein. Generally, the packets of a jittered PID stream are received in bunches, and the dejitterer 638 buffers the packets and retransmits the packets in a pre-determined fashion so that the packets are no longer temporarily bunched together. Thereby eliminating the jitter in the PID stream.

The statistical multiplexer 640 receives data control packet 700 that have a STAT-MUX indicator associated therewith. The statistical multiplexer 640 statistically multiplexes data control packet 700 of groups of PID streams together, wherein each PID stream of a group of PID streams is transmitted from the same transmitter 644. The statistically multiplex group of PID streams is statistically multiplexed such that the bit rate of the group of PID streams does not exceed a predetermined level. Generally, at least one PID stream in the group of PID streams is a variable bit rate PID stream.

Conventional statistical multiplexing of standard MPEG packets 400 requires that the payload portion 404 be in the clear, and therefore, only those PID streams that have been decrypted or were received in the clear can be statistically multiplexed. Statistical multiplexing introduces delays in a PID stream, and generally, only the video PID stream of a program is statistically multiplexed. In order to resynchronize the PID streams of a program, in which a video PID stream has been statistically multiplexed, the PID streams of the program need to be in the clear so that clock information contained in the payload portion of the packets can be synchronized. Details of a statistical multiplexer are provided in U.S. Pat. No. 6,057,384, which is hereby incorporated by reference in its entirety.

The encryptor 642 receives data control packet 700 that have an encryption indicator associated therewith. The encryptor 642 uses an encryption key 612, which is associated with the data control packet 700, to encrypt the data control packet 700.

The plurality of transmitter 644 receive data control packet 700 and transmit therefrom standard MPEG packets 400. The data control packet 700 received at the plurality of transmitter 644 have a transmitter identifier 704 associated therewith, which identifies the transmitter 644 from which the packet is transmitted.

In the preferred embodiment, the transmitter 644 are QAM modulators. However, it is understood that the type and the number of transmitters is a matter of implementation, and all appropriate transmitters known to those skilled in the art are intended to be within the scope of the present invention.

It should be noted that the transport stream controller 608 has been broken down into various elements based upon their functionality. However, those skilled in the art will recognize that the various elements of transport stream controller 608 can be implemented in common hardware devices or firmware modules. For example, a single hardware device could provide the decryption functionality of element 636 and encryption functionality of element 642. Generally, integrating the functionality such that each of the various elements described hereinabove does not require a separate processor to control its functions increases the efficiency and decreases the cost of the transport stream controller 608.

Referring to FIG. 7, a data control packet 700 includes a standard transport stream packet 400 with a data header 702 prepended thereon. The data header 702 includes a transmitter identifier field 704 and a data information field 706. The transmitter identifier field 706 identifies transmitters 644 from which the standard packet 400 is transmitted. The data information field 706 includes information used by the transport stream controller 608 for processing the standard packet 400. The processing information included in data information field 706 includes a counter that is used for indicating the number of transmitters 644 that are to receive a copy of the standard packet 400. The data information field 706 also includes clock information that is used to synchronize the various PID streams for each program stream included in output transport stream 242. The data information field 706 also includes information used by transport stream controller 608 for determining things such as, but not limited to, whether to decrypt, dejitter, statistical multiplex and encrypt standard packet 400. The data information field 706 is evaluated by the transport stream controller 608 for processing the standard packet 400 of data control packet 700.

Referring to FIG. 8, the multi-transport stream transmitter 228 performs the steps 800. In steps 800, "I" is a variable used to denote A, B, C or D. In step 802, the input processor 604 receives a standard packet 400, which is included in an input transport stream 240(I). The input processor identifies the PID look-up table 634(I) associated with the transport stream 240(I).

Next, in step 804, the input processor 604 uses the PID value of the received standard packet 400 and the PID look-up table 634(I), which is associated with the input transport stream 240(I), to determine the output PID value of the standard packet 400 and the transmitter(s) 644 from which the standard packet is transmitted. On the other hand, if the PID value of the standard packet 400 is not included in the PID look-up table 634(I), then the standard packet 400 is not included in any of the output transport streams 242 and the standard packet 400 is dropped.

In the preferred embodiment, the input processor 604 maintains a packet list for each transmitter 644 of the transport stream controller 608. When the input processor 604 stores a given data control packet 700 in memory 606, the input processor 604 sets a pointer to the memory location of data control packet 700 for each packet list associated with the transmitters 644 identified in the PID look-up table 624(I).

In step 806, the input processor 604 uses the input PID value of the standard packet 400 with decrypt/encrypt table 630(I), which is associated with the transport stream 240(I), to determine whether to decrypt the received standard packet 400. When the input processor 604 determines that the packet 400 is to be decrypted, the input processor associates the decryption key 612, which is used for decrypting the standard packet 400, with the data information 706.

Then, in step 808, the input processor 604 determines whether the received packet 400 should be encrypted by the transport stream controller 608 before inclusion into one or more output transport streams 242. The input processor 604 uses the input PID value of the received packet 400 and the decryption/encryption table 630(I) to determine whether the received packet 400 should be encrypted. When the packet 400 is encrypted by the transport stream controller 608, the input processor 604 associates the encryption key 612 for the standard packet 400 with the data information field 706 of the data header 702. Generally, the decryption key 612 and the encryption key 612 are associated with the data information 706 by including copies of the keys in the data information 706.

In step 810, the input processor 604 uses the input PID value of the received packet 400 and the STAT MUX table 628(I), which is associated with the input transport stream 240(I), to determine whether the received packet should be statistically multiplexed by the transport stream controller 608. When the received packet 400 should be statistically multiplexed a portion of the data information field 706 of data header 702 is flagged to indicate the statistical multiplexing of the received packet 400.

In step 812, the input processor 604 uses the input PID value of the received packet 400 and the dejitter table 632(I), which is associated with transport stream 240(I), to determine whether to dejitter the PID stream having the received packet 400 included therein. When the PID stream having the received packet 400 included therein is dejittered, a flag is set in data information field 706 of data header 702.

In step 814, the input processor 604 includes in the data information field 706 further processing information used by the transport stream controller 608. This processing information includes, among other information, the output PID value of the received packet, clock information, which is used for synchronizing the PD stream of packet 400 with the various PID streams of the program stream that includes packet 400 and sets the transport stream counter to the number of transmitters identified by the PID look-up table 624(I).

In step 816, the input processor 604 appends the data header 702 to the received packet 400, thereby making data control packet 700 and stores the data control packet 700 in memory 606.

In the preferred embodiment, the packet lists, each of which are associated with a transmitter 644 and maintained by the input processor 604 are linked lists. The top element of a given list, which is associated with a given transmitter, points to the memory location of the next data control packet 700 to be sent to the transport stream controller 608 for the given transmitter 644. In one embodiment, the input controller 604 reads the top element of each packet list sequentially. In another embodiment, the input controller 604 reads the top element of each packet lists according to the length of the packet lists, reading the longest packet list first.

In step 818, the input controller 604 reads a given packet list, which is associated with a given transmitter 644(J), where "J" is a variable denoting A, B, C, D, E or F, and copies the data control packet 700 stored in the memory location pointed to by the top element of the given packet list. The input controller 604 addresses the transmitter identifier field 704 of the copy of the data control packet 700 to the given transmitter 644 associated with the given packet list and sends the copy of the data control packet 700 to the transport stream controller 608. The input controller 604 then decrements the transport stream counter included in the data information field 706 of the data control packet 700 stored in the memory location pointed to by the current top element of the given packet list. The transmitter counter is decremented each time a copy of the data control packet is made. When the transmitter counter is zero, the input controller 604 knows that all of the transmitters 644 that are associated with the data control packet 700 have had a copy of the data control packet 700 sent to them. The input controller 604 then knows that the data control packet 700 having a transmitter counter value of zero can be overwritten in memory 606. The controller 604 also removes the current top element of the given packet list, so that the next time the given packet list is read the new top element points to a memory location having a different data control packet 700 stored therein.

In the preferred embodiment, the transport stream controller 608 processes data control packets as fast or faster than the input processor sends them. In which case, the transport stream controller 608 is always ready to receive data control packets 700 from memory 608. However, the transport stream controller 608 can introduce some delays in the PID streams by dejittering, or other processing, and therefore, the various elements of the transport stream controller 608, such as the statistical multiplexer 640, have throttles included therein for controlling the flow of the PID streams passing therethrough. The transport stream controller 608 can send a message via communication link 610 to the input processor 604 that causes the input processor 604 to suspend sending data control packets 700 to the transport stream controller 608. When the transport stream controller 608 is ready to process further data control packets 700, the transport stream controller 608 sends a subsequent message to the input processor 604, which causes the input processor 604 to resume sending data control packets 700 to the transport stream controller 608.

In step 820, the transport stream controller 608 receives a data control packet 700, which is addressed to a particular transmitter 644. The data header 702 of the data control packet 700 includes processing information that is used by the decryptor 636, the dejitterer 638, the statistical multiplexer 640 and the encryptor 642 for determining how the packet is processed. In some situations, the processing information of data control packet 700 indicates that the data control packet is sent directly to the transmitter 644 identified by the transmitter identifier 704.

Next, in step 822, the transmitter 644, which is identified by the transmitter identifier 704, receives a data control packet 700. The transmitter removes the data header 700 from the standard packet 400 and transmits the standard packet 400 therefrom.

It is to be understood that the steps 800 may be performed in alternative order. In another embodiment, the input processor 604 stores the data control packet 700 in memory 606, and when the data control packet is retrieved from the memory 606 for a given transmitter 644, the input processor uses tables 616 to determine how the data control packet is to be processed by the transport stream controller 608. In this embodiment, the processing information included in the data 702 can be specific to the given transmitter; for example, for one transmitter the data control packet 700 can be encrypted with a first encryption key, and the PID value of the standard packet 400 can be remapped to a first PID value; and for another transmitter a second encryption key can be used to encrypt the data control packet 700, and the PID value of the standard packet 400 can be remapped to a second PID value.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method of providing a transport stream, which includes a group of PID streams, wherein a PID stream is a stream of packets having a common packet identifier (PID) associated therewith, with a predetermined maximum bit rate, the method is implemented in a receiver-transmitter adapted to receive and transmit transport streams, the method comprising:

receiving an input transport stream having a plurality of PID streams included therein, wherein packets in each of the PID streams have a respective PID value;

determining at the receiver-transmitter whether to decrypt a first at least one PID stream of the plurality of received PID streams based on the PID value of the first at least one PID stream and an encrypt/decrypt look-up table;

decrypting at the receiver-transmitter the first at least one PID stream based on the determination of whether to decrypt;

statistically multiplexing at the receiver-transmitter a second at least one PID stream of the plurality of received PID streams into a group of PID streams, wherein the bit rate of the group of PID streams does not exceed the predetermined maximum bit rate;

encrypting a third at least one PID stream of the plurality of received PID streams;

transmitting from the receiver-transmitter a fourth at least one PID stream of the plurality of received PID streams from at least one transmitter;

determining at the receiver-transmitter whether to statistically multiplex the second at least one PID stream; and the statistically multiplexing at the receiver-transmitter being based on the determination of whether to statistically multiplex;

wherein the determining whether to statistically multiplex is based on the PID value of the second at least one PID stream and a stat-mux lookup table.

2. The method of claim 1, wherein the first at least one PID stream is a given PID stream, the second at least one PID stream is a plurality of PID streams having the given PID stream included therein and the fourth at least one PID stream is a plurality of PID streams having the given PID stream included therein.

3. The method of claim 1, wherein the first at least one PID stream is a plurality of PID streams having a given PID stream included therein, the second at least one PID stream is a plurality of PID streams having the given PID stream included therein, the third at least one PID stream is a plurality of PID streams having the given PID stream included therein and the fourth at least one PID stream is a plurality of PID streams having the given PID stream included therein.

4. The method of claim 1, wherein the fourth at least one PID stream is a plurality of PID streams having at least one variable bit rate PID stream included therein.

5. A method of providing a transport stream, which includes a group of PID streams, wherein a PID stream is a stream of packets having a common packet identifier (PID) associated therewith, with a predetermined maximum bit rate, the method is implemented in a receiver-transmitter adapted to receive and transmit transport streams, the method comprising:

receiving an input transport stream having a plurality of PID streams included therein, wherein packets in each of the PID streams have a respective PID value;

determining at the receiver-transmitter whether to decrypt a first at least one PID stream of the plurality of received PID streams based on the PID value of the first at least one PID stream and an encrypt/decrypt look-up table;

decrypting at the receiver-transmitter the first at least one PID stream based on the determination of whether to decrypt;

statistically multiplexing at the receiver-transmitter a second at least one PID stream of the plurality of received PID streams into a group of PID streams, wherein the bit rate of the group of PID streams does not exceed the predetermined maximum bit rate;

encrypting a third at least one PID stream of the plurality of received PID streams;

transmitting from the receiver-transmitter a fourth at least one PID stream of the plurality of received PID streams from at least one transmitter;

determining at the receiver-transmitter whether to statistically multiplex the second at least one PID stream;

the statistically multiplexing at the receiver-transmitter being based on the determination of whether to statistically multiplex;

determining at the receiver-transmitter whether to encrypt the third at least one PID stream; and appending a data header to each packet of a PID stream at the receiver-transmitter, the data header used for processing the packet including at least one of the decrypting of the first at least one PID stream, the statistically multiplexing of the second at least one PID stream and encryption of the third at least one PID stream.

6. The method of claim 5, wherein the data header includes a decryptor indicator, and the step of determining whether to decrypt the first at least one PID stream includes evaluating the decryptor indicator.

7. The method of claim 6, wherein the data header of each packet of the first at least one PID stream includes a decryption key that is used to decrypt each packet of the first at least one PID stream.

8. The method of claim 5, wherein the data header includes a stat-mux indicator, and the step of determining whether to statistically multiplex the second at least one PID stream includes using the stat-mux indicator.

9. The method of claim 5, wherein the data header includes an encryptor indicator, and the step of determining whether to encrypt the third at least one PID stream includes evaluating the encryptor indicator.

10. The method of claim 9, wherein the data header of each packet of the third at least one PID stream includes an encryption key, and the encryption key is used to encrypt at least a portion of the packet having the encryption key.

11. The method of claim 1, further including the step of: determining at the receiver-transmitter whether to dejitter a fifth at least one PID stream of the plurality of received PID streams, and responsive thereto, dejittering at the receiver-transmitter the fifth at least one PID stream.

12. The method of claim 11, wherein the fifth at least one PID stream comprises a plurality of packets, each packet having a data header, and the data header is used in determining whether to dejitter the fifth at least one PID stream.

13. A method of providing a transport stream, which includes a group of PID streams, wherein a PID stream is a stream of packets having a common packet identifier (PID) associated therewith, with a predetermined maximum bit rate, the method is implemented in a receiver-transmitter adapted to receive and transmit transport streams, the method comprising:
receiving an input transport stream having a plurality of PID streams included therein, wherein packets in each of the PID streams have a respective PID value;
determining at the receiver-transmitter whether to decrypt a first at least one PID stream of the plurality of received PID streams based on the PID value of the first at least one PID stream and an encrypt/decrypt look-up table;
decrypting at the receiver-transmitter the first at least one PID stream based on the determination of whether to decrypt;
statistically multiplexing at the receiver-transmitter a second at least one PID stream of the plurality of received PID streams into a group of PID streams, wherein the bit rate of the group of PID streams does not exceed the predetermined maximum bit rate;
encrypting a third at least one PID stream of the plurality of received PID streams;
transmitting from the receiver-transmitter a fourth at least one PID stream of the plurality of received PID streams from at least one transmitter; and
remapping at the receiver-transmitter the PID value of a fifth at least one PID stream to a new PID value whereupon each PID stream of the fourth at least one PID stream has a unique PID value associated therewith.

14. The method of claim 13, wherein the at least one transmitter is a plurality of transmitters, and further comprising: associating at the receiver-transmitter a plurality of received PID streams into a plurality of groups, and each group of PID streams is transmitted from a unique transmitter of the receiver-transmitter.

15. The method of claim 14, wherein the PID value of a given PID stream is remapped from a first PID value to a second PID value, and the given PID stream having the second PID value associated therewith is transmitted from a plurality of transmitters.

16. The method of claim 1, wherein the input transport stream includes a first PID stream and a second PID stream, wherein the received first PID stream is an encrypted PID stream, wherein the first PID stream is decrypted, wherein the second at least one PID stream is a plurality of PID streams having the decrypted first PID stream and the second PID stream included therein, and wherein after being statistically multiplexed the decrypted first PID stream is encrypted by a first encryption key and the second PID stream is encrypted by a second encryption key.

17. A method of providing a transport stream in a receiver-transmitter, the method comprising:
receiving an input transport stream having a plurality of packet identifier (PID) streams included therein, the plurality of PID streams comprising first, second, third, and fourth PID streams, wherein each of the PID streams is associated with a PID value;
determining at the receiver-transmitter whether to decrypt the first PID stream based on the PID value of the first at least one PID stream and an encrypt/decrypt look-up table;
decrypting at the receiver-transmitter the first PID stream based on the determination of whether to decrypt;
determining at the receiver-transmitter whether to statistically multiplex the second PID stream;
statistically multiplexing at the receiver-transmitter the second PID stream based on the determination of whether to statistically multiplex;
determining at the receiver-transmitter whether to encrypt the third PID stream;
encrypting at the receiver-transmitter the third PID stream based on the determination of whether to encrypt;
transmitting from the receiver-transmitter the fourth PID stream; and
appending a data header to each packet of a PID stream at the receiver-transmitter based on each of the determinations, the data header used for processing the packet, including at least one of the decrypting of the first at least one PID stream, the statistically multiplexing of the second at least one PID stream and the encrypting of the third at least one PID stream.

18. The method of claim 17, wherein the receiving, decrypting, statistically multiplexing, encrypting, and transmitting are implemented for additional PID streams of the plurality of HD streams.

19. The method of claim 17, wherein the statistically multiplexing comprises statistically multiplexing the second PID stream into a group of PID streams, wherein a bit rate of the group of PID streams does not exceed a predetermined maximum bit rate.

20. The method of claim 1, wherein the determining whether to encrypt is based on the PID value of the third at least one PID stream and the encrypt/decrypt lookup table.

21. A method of providing a transport stream, which includes a group of PID streams, wherein a PID stream is a stream of packets having a common packet identifier (PID) associated therewith, with a predetermined maximum bit rate, the method is implemented in a receiver-transmitter adapted to receive and transmit transport streams, the method comprising:

receiving at the receiver-transmitter an input transport stream having a plurality of PID streams included therein, wherein each of the plurality of PID streams includes a PID value;

determining at the receiver-transmitter whether to decrypt a first at least one PID stream of the plurality of PID streams based on a PID value of the first at least one PID stream and an encrypt/decrypt lookup table;

determining at the receiver-transmitter whether to statistically multiplex a second at least one PID stream of the plurality of PID streams;

determining at the receiver-transmitter whether to encrypt the third at least one PID stream of the plurality of PID streams;

transmitting at the receiver-transmitter a fourth at least one PID stream of the plurality of PID streams;

decrypting at the receiver-transmitter the first at least one PID stream based on the determination of whether to decrypt;

statistically multiplexing at the receiver-transmitter the second at least one PID stream based on the determination of whether to statistical multiplex;

encrypting at the receiver-transmitter the third at least one PID stream based on the determination of whether to encrypt; and appending a data header to each packet of a given PID stream at the receiver-transmitter based on each of the determinations, the data header used for processing the given packet at the receiver transmitter, including at least one of the decrypting of the first at least one PID stream, the statistically multiplexing of the second at least one PID stream and the encrypting of the third at least one PID stream.

22. The method of claim 21, wherein a the first at least one PID stream is a given PID stream, the second at least one PID stream is a plurality of PID streams having the given PID stream included therein and the fourth at least one PID stream is a plurality of PID streams having the given PID stream included therein.

* * * * *